(12) United States Patent
Izumo et al.

(10) Patent No.: US 8,479,565 B2
(45) Date of Patent: Jul. 9, 2013

(54) FLUID CONVEYING TUBE AND FLUID LEAKAGE DETECTING SYSTEM

(75) Inventors: Masaki Izumo, Chiba (JP); Yasuhiro Naka, Kameyama (JP); Kenichi Ishii, Kisarazu (JP); Toru Kagoura, Ichihara (JP)

(73) Assignees: Furukawa Electric Co., Ltd., Tokyo (JP); Japan Oil, Gas and Metals National Corporation, Kawasaki (JP)

( * ) Notice: Subject to any disclaimer, the term of this patent is extended or adjusted under 35 U.S.C. 154(b) by 337 days.

(21) Appl. No.: 12/922,511

(22) PCT Filed: Mar. 9, 2009

(86) PCT No.: PCT/JP2009/054454
§ 371 (c)(1),
(2), (4) Date: Sep. 14, 2010

(87) PCT Pub. No.: WO2009/119297
PCT Pub. Date: Oct. 1, 2009

(65) Prior Publication Data
US 2011/0005303 A1    Jan. 13, 2011

(30) Foreign Application Priority Data
Mar. 28, 2008    (JP) ................................. 2008-088719

(51) Int. Cl.
*G01M 3/28*    (2006.01)
(52) U.S. Cl.
USPC ................ 73/40.5 R; 73/49.1; 73/46; 73/49.5
(58) Field of Classification Search
USPC .................. 73/40.5 R, 49.1, 52, 46
See application file for complete search history.

(56) References Cited

U.S. PATENT DOCUMENTS 5,308,162 A * 5/1994 Amano et al. ................ 374/131
6,186,181 B1 * 2/2001 Schippl ........................ 138/112
(Continued)

FOREIGN PATENT DOCUMENTS

JP    U-58-112797       8/1983
JP       04009651 A *   1/1992
(Continued)

OTHER PUBLICATIONS

International Search Report issued in Application No. PCT/JP2009/054454; Dated Jun. 2, 2009.
(Continued)

*Primary Examiner* — Hezron E Williams
*Assistant Examiner* — Paul West
(74) *Attorney, Agent, or Firm* — Oliff & Berridge, PLC

(57) ABSTRACT

Provided are a fluid conveying tube and a fluid leakage detecting system which can convey a cryogenic fluid such as LNG and which can quickly and reliably detect leakage of the fluid within the tube and the position of the leakage. An optical fiber is continuously wound over the entire length of a flexible tube. Leakage information detected by an optical fiber temperature sensor is transmitted via a terminal to an externally provided temperature measurement device. Meanwhile, when similar leakage occurs in the vicinity of a coupling section, the gas pressure inside the heat insulating layer or the like increases due to the pressure of LNG within a corrugated tube or a pressure generated as a result of evaporation of LNG. When the pressure inside the heat insulating layer increases, information representing a change in the gas pressure is transmitted to a terminal via a hollow pipe. A tube or the like is externally connected to the terminal, and is connected to a pressure meter or like.

2 Claims, 12 Drawing Sheets

U.S. PATENT DOCUMENTS

| | | | | |
|---|---|---|---|---|
| 7,942,452 | B2 * | 5/2011 | Carns et al. | ............... 285/93 |
| 2005/0155663 | A1 | 7/2005 | Dhellemmes et al. | |

FOREIGN PATENT DOCUMENTS

| JP | A-04-009651 | 1/1992 |
|---|---|---|
| JP | A-05-065718 | 3/1993 |
| JP | A-05-180375 | 7/1993 |
| JP | A-05-223656 | 8/1993 |
| JP | A-06-118285 | 4/1994 |
| JP | A-06-148017 | 5/1994 |
| JP | A-10-082621 | 3/1998 |
| JP | A-10-206240 | 8/1998 |
| JP | A-11-325327 | 11/1999 |
| JP | A-2005-207592 | 8/2005 |

OTHER PUBLICATIONS

Office Action for Japanese Patent Application No. 2008-088719 mailed Dec. 18, 2012 (with translation).

International Preliminary Report on Patentability for International Patent Application No. PCT/JP2009/054454 issued Nov. 9, 2010.

* cited by examiner

Ia: INTENSITY OF ANTI-STOKES LIGHT

Is: INTENSITY OF STOKES LIGHT (a)

(b)

(a)

(b)

FLUID CONVEYING TUBE AND FLUID LEAKAGE DETECTING SYSTEM

TECHNICAL FIELD

The present invention relates to a fluid conveying tube used, for example, to convey fluid such as cryogenic liquefied natural gas, and to a fluid leakage detecting system for detecting leakage of the fluid from the fluid conveying tube.

BACKGROUND ART

Conventionally, when petroleum oil or the like produced from a subsea oil field or the like is to be loaded into a transport tanker from a floating facility (a base) on the sea where the petroleum oil or the like is stored or when the petroleum oil or the like is unloaded to a tank or the like on the ground, a floating flexible tube is connected to the tanker, and the petroleum oil or the like is conveyed through the flexible tube. In general, a flexible tube formed of resin is used for conveying petroleum oil or the like of ordinary temperature. As such a resin flexible tube for fluid transport, there is known a flexible fluid conveying tube which has a reinforcement layer, a heat insulating layer, a waterproof layer, etc., provided on the outer periphery of an inner tube formed of resin (Patent Document 1).

Meanwhile, natural gas or the like produced from gas fields on land or in adjacent sea is liquefied and stored at a base. When liquefied natural gas (hereinafter referred to as "LNG") is loaded onto a transport tanker, an articulated loading arm or the like provided at a coastal base is used. Examples of a base for receiving LNG include an LNG receiving base system and an LNG shipping base system which are described in Patent Document 2 and in which a loading arm scheme is employed (Patent Document 2).

Moreover, there is known an LNG leakage monitoring apparatus which monitors leakage of LNG from equipment connected to an LNG tank by use of an optical fiber installed along a liquid guide tube and a liquid collection pit (Patent Document 3).

Patent Document 1: Japanese Patent Application Laid-Open (kokai) No. H5-180375
Patent Document 2: Japanese Patent Application Laid-Open (kokai) No. H5-65718
Patent Document 3: Japanese Patent Application Laid-Open (kokai) No. H10-206240

DISCLOSURE OF THE INVENTION

Problems to be Solved by the Invention

However, a scheme which has been conventionally employed for transport of petroleum oil and in which fluid is transported by a tanker by making use of a floating flexible tube formed of resin as disclosed in Patent Document 1 encounters difficulty in coping with cryogenic fluid such as LNG, for the following reason. LNG has a very low temperature of about −160° C., and the conventional floating flexible tube formed of resin becomes brittle at such a very low temperature. Therefore, the conventional floating flexible tube fails to have sufficient flexibility, and, through embrittlement, the flexible tube breaks due to pressure under which LNG is fed. Accordingly, flexible tubes which can be used at a very low temperature and which have sufficient durability and heat insulating performance are required. However, conventionally, a floating flexible tube which can be used for transport of cryogenic fluid, such as LNG, on the sea has not been provided.

The loading arm scheme as disclosed in Patent Document 2 can be used for loading from a base on land to a tanker. However, if the loading arm scheme is used to load LNG onto a tanker from a floating facility which is disposed at an open sea gas field and which produces and stores LNG, the loading arm fails to follow movement of the tanker in relation to the facility which greatly shakes because of waves, wind, etc. In addition, the loading arm scheme has a problem of causing an increase in the size of the facility.

The leakage monitoring apparatus as disclosed in Patent Document 3 can detect leakage of LNG from equipment connected to an LNG tank on the basis of a temperature change at a position where the optical fiber is installed. However, in the vicinity of a coupling section (connection section) of an LNG conveying tube, sufficient heat insulation cannot be provided, and therefore, the temperature is low even in an ordinary state. Therefore, the leakage monitoring apparatus has a problem of failing to detect a temperature change caused by leakage.

In the case where an optical fiber temperature sensor is used, measurement sensitivity drops unless some measurement distance (a distance from an incidence position of an optical pulse) is secured. Therefore, in the case where leakage of LNG from a fluid conveying tube is detected through installation of an optical fiber, there arises a problem in that the sensitivity in detecting leakage drops at a coupling section in the vicinity of an end portion of the fluid conveying tube.

A method of detecting leakage of LNG from a pressure drop within LNG piping is also described. Although this method can detect large-scale leakage which causes a pressure drop within the LNG piping, the method cannot detect leakage of a small amount of LNG through a pinhole.

In particular, as described above, in the case where a flexible tube is used for transport of LNG on the sea, an unreasonably large force is likely to act on the vicinity of a coupling section of the flexible tube, and, therefore, the coupling section is an important location for monitoring leakage. However, there is a problem in that there has not been provided a method of reliably detecting leakage of LNG or the like from a connecting portion of a tube for transporting the LNG or the like. Moreover, in the case where a flexible tube is used for transport on the sea, determining a leakage position is difficult, as compared with the case of fixed piping on the ground as described in Patent Document 3. Therefore, it is necessary to quickly and reliably specify the presence/absence and position of leakage from a remote location. However, there is a problem in that a method of quickly and reliably specifying the presence/absence and position of leakage from a remote location has not been provided.

The present invention has been accomplished in view of such problems, and its object is to provide a fluid conveying tube and a fluid leakage detecting system which can convey a cryogenic fluid such as LNG and which can quickly and reliably detect leakage of the fluid within the tube and the position of the leakage.

Means for Solving the Problems

To achieve the above object, a first invention provides a fluid conveying tube, characterized by comprising; a tube member; a heat insulating layer provided on the outer periphery of the tube member; an optical fiber continuously wound around the heat insulating layer; a coupling section provided at an end portion of the tube member; and leakage information transmission means provided in the vicinity of the coupling section and being capable of transmitting, to the outside of the coupling section, leakage information of fluid which flows through the tube member.

The term "leakage information" refers to information regarding leakage of the fluid flowing through the conveying tube; specifically, measurement data of gas pressure, gas concentration, or the like. The leakage information transmission means may transmit the gas pressure or gas concentration in the vicinity of the coupling section to the outside of the coupling section via a terminal provided in the vicinity of the coupling section. In this case, desirably, the leakage information transmission means detects the gas pressure or gas concentration in the vicinity of the coupling section via a hollow pipe communicating with the heat insulating layer. The tube member may be a corrugated metallic tube having flexibility.

According to the first invention, since the heat insulating layer proves thermal insulation between the fluid within the tube member and the outside of the conveying tube, the fluid is not affected by the outside temperature. Moreover, since an optical fiber is continuously wound around the heat insulating layer, when the fluid leaks from the tube member, the optical fiber temperature sensor can detect the temperature of the fluid permeating the heat insulating layer, to hereby detect the presence/absence of a portion from which the fluid has leaked and the location of the leakage.

Since the leakage information transmission means provided in the vicinity of the coupling section can detect the gas pressure or gas concentration in the heat insulating layer, leakage information in the vicinity of the coupling section, which is difficult to be detected by the optical fiber, can be detected. In particular, in the case where a hollow pipe is provided in the heat insulating layer and can transmit the gas pressure or gas concentration to the outside of the coupling section via the terminal, leakage of the fluid in the vicinity of the coupling section can be detected from a change in the gas pressure in the heat insulating layer or a change in the gas concentration in the heat insulating layer. Therefore, fluid leakage information can be obtained without fail even in the case of small leakage in the vicinity of the coupling section.

In the case where the tube member is a corrugated metallic tube, the fluid conveying tube can be used for conveyance on the sea. In such a case, in particular, leakage in the vicinity of the coupling section becomes a problem. However, the presence/absence of leakage and the position of the leakage can be detected without fail from a remote location.

A second invention is a fluid leakage detecting system in which the fluid conveying tube according to the first invention is used; the optical fiber is connected to a temperature measurement device and functions as an optical fiber temperature sensor, wherein leakage of the fluid from the tube member is detected from a temperature distribution measured by the optical fiber temperature sensor; and leakage of the fluid from the tube member in the vicinity of the coupling section is detected from leakage information transmitted from the leakage information transmission means.

The fluid leakage detecting system may further comprise an optical pressure sensor connected to the leakage information transmission means; and an optical pressure sensor converter for converting information output from the optical pressure sensor to pressure information, wherein a plurality of optical fibers are provided in the fluid conveying tube; a portion of the plurality of optical fibers is connected to the temperature measurement device and functions as the optical fiber temperature sensor; and the remaining optical fiber(s) is connected to the optical pressure sensor converter and functions as a medium for transmitting information from the optical pressure sensor.

The fluid leakage detecting system may further comprise an optical switch connected to the optical fiber, wherein the optical fiber can be connected to either the temperature measurement device or the optical pressure sensor converter by means of switching effected by the optical switch, and wherein, when the optical fiber is connected to the temperature measurement device, the optical fiber functions as the optical fiber temperature sensor, and, when the optical fiber is connected to the optical pressure sensor converter, the optical fiber functions as a medium for transmitting information from the optical pressure sensor.

According to the second invention, there can be obtained a fluid leakage detecting system in which leakage of the fluid in the fluid conveying tube can be detected by use of the optical fiber temperature sensor, and leakage of the fluid in the vicinity of the coupling section of the fluid conveying tube can be detected by the leakage information transmission means.

The term "leakage information" refers to a change in a state, such as gas pressure or gas concentration, in the fluid conveying tube, caused by leakage of the fluid from the tube member. The term "leakage information transmission means" refers to means for leading and transmitting the leakage information to the outside of the fluid conveying tube, to thereby enable the presence/absence of leakage to be detected outside the fluid conveying tube.

Furthermore, a change in the gas pressure in the heat insulating layer, which serves as the leakage information, is led to the optical pressure sensor provided outside the fluid conveying tube; the presence/absence of leakage is detected from the pressure change; and the information from the optical pressure sensor is transmitted via the optical fiber. Therefore, the information regarding leakage over the entire length of the fluid conveying tube and leakage in the vicinity of the coupling section can be obtained via the optical fiber. Moreover, in the case where switching between the optical pressure sensor and the optical fiber temperature sensor is performed by use of the optical switch, a plurality of pieces of information can be obtained by use of a single optical fiber. Further, through provision of a plurality of optical fibers, there can be obtained a fluid leakage detecting system which can detect leakage of fluid in the fluid conveying tube without fail, even when one of the optical fibers breaks.

Effect of the Invention

According to the present invention, there can be provided a fluid conveying tube and a fluid leakage detecting system which allow transport of a cryogenic fluid such as LNG and which can quickly and reliably detect leakage of the fluid within the tube and the position of the leakage.

BRIEF DESCRIPTION OF THE DRAWINGS

FIG. 1 is a view showing the state of use of a flexible tube 1a.

FIG. 2 is a perspective view showing the structure of the flexible tube 1a.

FIG. 3 is a partial sectional view showing the structure of the flexible tube 1a.

FIG. 8(b) is a sectional view of a coupling section 3b of the flexible tube 1c and the vicinity thereof.

Figure 1:
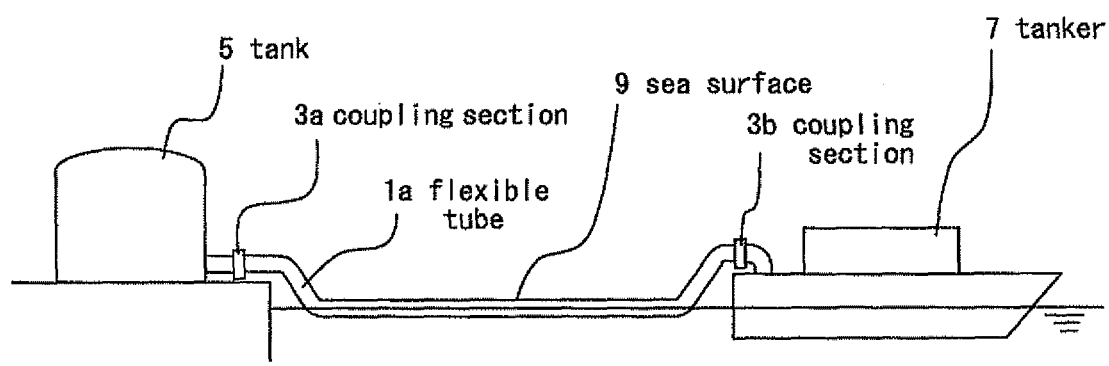

DESCRIPTION OF REFERENCE NUMERALS 1a, 1b, 1c: flexible tube
3a, 3b: coupling section (coupling part)
5: tank
7: tanker
9: sea surface
11: corrugated tube
13a, 13b: heat insulating layer
15: waterproof layer
17, 18: optical fiber
19: metallic tube
21: optical fiber temperature sensor
23: temperature dropped portion
25a, 25b: terminal
27, 28a, 28b: hollow pipe
29: epoxy resin
30, 40, 60: leakage detection system
31: temperature measurement device
33a, 33b: pressure meter
41: optical pressure sensor
42a, 42b: pressure sensor converter
43: optical fiber
45a, 45b: wall member
47: space
49: diaphragm
51: gas introduction portion
53: optical fiber displacement sensor
55a, 55b: support
57: spacer
58a, 58b, 58c: optical fiber
59: optical switch

BEST MODE FOR CARRYING OUT THE INVENTION

Flexible tubes 1 according to an embodiment of the present invention will now be described. FIG. 1 is a view showing the state of use of a flexible tube 1a. Fluid such as LNG transported by a tanker 7 is conveyed to a tank 5 via the flexible tube 1a. The flexible tube 1a is wound around a drum or the like for storage. When the flexible tube 1a is used, the flexible tube 1a is fed from the drum or the like onto the sea. On the sea, an end portion (a coupling section 3b) of the flexible tube 1a is guided to the tanker 7 by a small ship or the like.

The tanker 7 is coupled with the flexible tube 1a at the coupling section 3b thereof. That is, the tanker 7 is connected to the tank 5 via the flexible tube 1a. The coupling sections 3a and 3b, which are provided at opposite ends of the flexible tube 1a, are coupled with unillustrated coupling sections of the tanker 7 and the tank 5. The flexible tube 1a is floating on a sea surface 9, and shakes due to waves, wind, or the like. However, since the flexible tube 1a has flexibility, the flexible tube 1a can follow the movement of the sea surface 9 or the like. Accordingly, the coupling sections 3a and 3b always receive forces due to shaking of the flexible tube 1a or the like, and, therefore, the coupling sections 3a and 3b are portions which easily deteriorate and have high risk of leakage.

Figure 2:
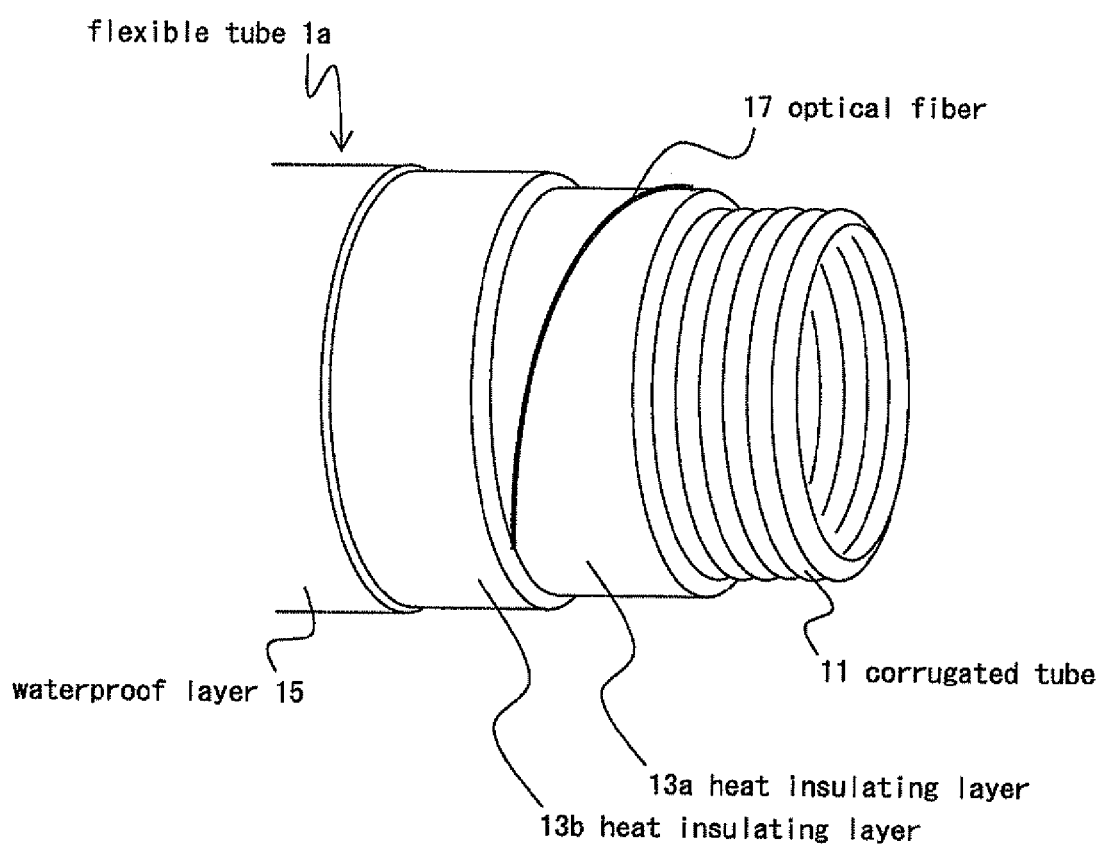
Figure 3:
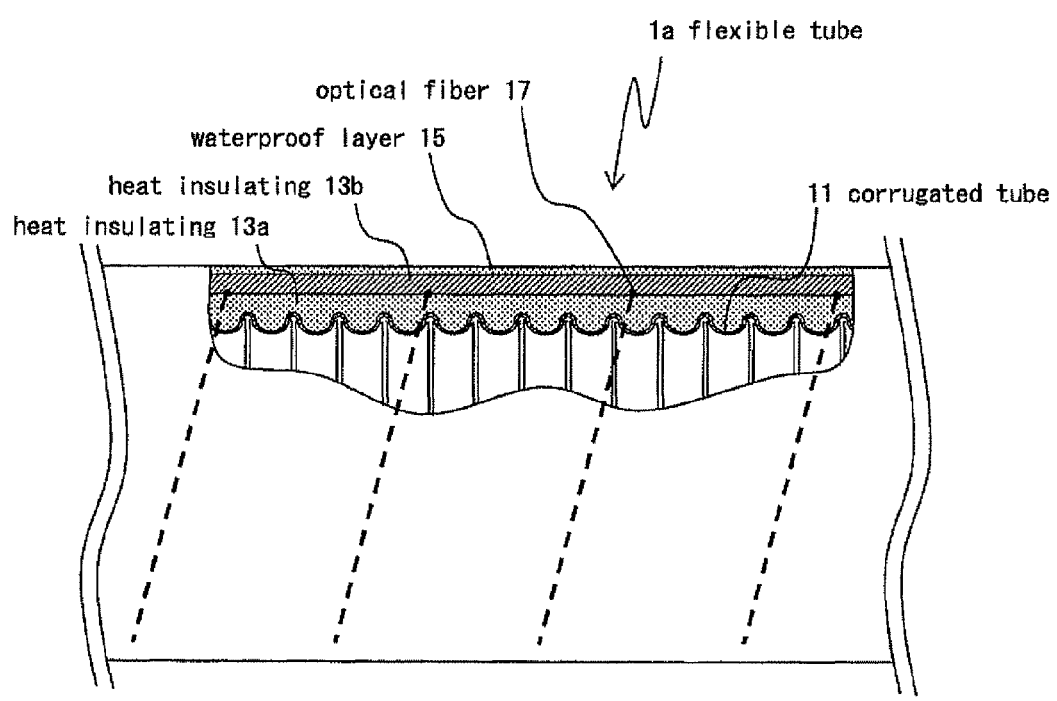

Next, the flexible tube 1a will be described. FIG. 2 is a perspective view showing the structure of the flexible tube 1a; and FIG. 3 is a partial sectional view of the flexible tube 1a. The flexible tube 1a is mainly composed of a corrugated tube 11, heat insulating layers 13a, 13b, a waterproof layer 15, and an optical fiber 17.

In general, in consideration of transport efficiency of fluid, a tanker 7 of 100,000 tons to 150,000 tons is used for transport of fluid on the sea. Furthermore, since weather changes greatly on the sea, in general, an operation of transporting fluid from a tanker or the like is desired to be completed within 24 hours. Accordingly, in the case where the flow rate of fluid is 5 m/sec, several flexible tubes 1a, each having a diameter of about 400 mm to 500 mm, are used simultaneously in consideration of transport efficiency. Desirably, the flexible tube 1a has a large diameter so as to increase fuel transport efficiency. However, in such a case, the allowable bending radius of the flexible tube 1a increases, and an apparatus for laying the flexible tube 1a increases in size. Therefore, the diameter of the flexible tube 1a is properly determined in accordance with conditions of use, etc.

The innermost layer of the flexible tube 1a is the corrugated tube 11, which is provided as a tube member. When the flexible tube 1a is used, fluid (in the following description, the fluid is assumed to be LNG) is caused to flow through the corrugated tube 11. The corrugated tube 11, which is a tube member having flexibility, has some strength and is excellent in low-temperature resistance. That is, preferably, the corrugated tube 11 is formed of a material which can maintain flexibility and is unlikely to generate a fissure or crack even when cryogenic fluid, such as LNG, flows through the corrugated tube 11.

For example, the corrugated tube 11 is a corrugated tube formed of metal, desirably, a bellow tube formed of stainless steel. Notably, in place of the corrugated tube 11, a tube member of other type may be used, so long as the tube member to be used has flexibility of a similar degree and is excellent in low-temperature resistance.

The heat insulating layers 13a are 13b are provided on the outer periphery of the corrugated tube 11. The heat insulating layers 13a and 13b provide thermal insulation between LNG flowing through the corrugated tube 11 and the outside of the flexible tube 1a, and can deform so as to follow flexing of the corrugated tube 11. That is, the heat of LNG is hardly transmitted to the outer surface of the flexible tube 1a. Therefore, the waterproof layer 15, which is the outermost layer to be described later, does not receive the influence of the temperature of the LNG. Similarly, the outside temperature of the flexible tube 1a is not transmitted to the LNG, whereby evaporation of the LNG within the flexible tube 1a is prevented.

Desirably, a material which is excellent in heat insulating performance and air permeability is used to form the heat insulating layers 13a and 13b. For example, nonwoven fabric, preferably, polyester fiber nonwoven fabric, is desirably used to form the heat insulating layers 13*a* and 13*b*. Desirably, the heat insulating layers 13*a* and 13*b* have a thickness of 5 mm or greater.

Further, fiber-based nonwoven fabric containing aerogel can be used to form the heat insulating layer 13*b*. For example, silica aerogel may be used as the aerogel, and the aerogel is included in the nonwoven fabric (through impregnation). The aerogel has an extremely high heat insulating performance and has a high load resistance. Further, the nonwoven fabric containing the aerogel is very poor in liquid permeability. Therefore, even when LNG reaches the heat insulating layer 13*b*, the LNG hardly permeates the heat insulating layer 13*b*. Furthermore, since the nonwoven fabric containing the aerogel is unlikely to collapse, the waterproof layer 15 to be described later does not loosen.

Here, aerogel refers to a substance which is produced in the form of gel through replacement of moisture with gas, which contains air in an amount of about 90% or more by volume, and which is very light and has high heat insulating performance. Aerogel is mainly formed of silica, alumina, or the like, and is used as catalyst or absorbent in many cases.

When necessary, an unillustrated seat layer may be provided between the corrugated tube 11 and the heat insulating layer 13*a*. The seat layer absorbs unevenness (projections and depressions attributable to the corrugated shape) on the outer circumference of the corrugated tube 11 to thereby provide a generally flat circumferential surface. For example, nonwoven fabric or the like can be used to form the seat layer. The seat layer is unnecessary in the case where the inner tube does not have a large unevenness on the outer circumferential surface thereof attributable to, for example, its corrugated shape, or the case where the unevenness does not adversely affect the heat insulating layers 13*a* and 13*b*, etc. provided on the outer periphery of the inner tube.

When necessary, an unillustrated reinforcement layer may be provided on the inner circumference surface of the heat insulating layer 13*a*. The reinforcement layer suppresses mainly deformation (extension) of the corrugated tube 11 in the axial direction of the flexible tube 1*a*. For example, when LNG is caused to flow into the corrugated tube 11, an internal pressure of about 1 MPa is produced within the corrugated tube 11. The corrugated tube 11 can withstand a pressure acting on the inner circumferential surface of the corrugated tube 11. However, upon generation of an internal pressure, the corrugated tube 11 easily deforms (extends) in the axial direction of the corrugated tube 11 because of the corrugated shape provided so as to attain flexibility. Therefore, the reinforcement layer is provided so as to suppress deformation of the corrugated tube 11 in the axial direction.

The reinforcement layer is formed by means of winding reinforcement tape such as fiber tape, metallic tape, or the like. Examples of the fiber tape includes polyester fiber fabric tape, aramid fiber fabric tape, arylate fiber fabric tape, ultra-high molecular weight polyethylene fiber fabric tape, and carbon fiber fabric tape. An example of the metallic tape is stainless steel tape.

When necessary, an unillustrated holding winding layer for holding the reinforcement tape may be provided on the outer periphery of the wound reinforcement tape. The holding winding layer may be formed by use of, for example, nonwoven fabric tape, and may be wound around the outer surface of the reinforcement layer formed through alternate winding of the reinforcement tape, or the outer surface of each winding layer.

The waterproof layer 15 is provided on the outer periphery of the heat insulating layer 13*b*. The waterproof layer 15 can prevent entry of water from the outside, and can deform so as to follow flexing of the corrugated tube 11. That is, seawater or the like does not infiltrate into the interior of the flexible tube 1*a*, even when the flexible tube 1*a* is laid on the sea and LNG is transported through the flexible tube 1*a*. Notably, the waterproof layer 15 is formed of, for example, resin, preferably, polyethylene. As described above, since the heat insulating layers 13*a* and 13*b* are present, the influence of the temperature of LNG (cryogenic fluid) hardly reach the waterproof layer 15. Therefore, there is no possibility that the waterproof layer 15 becomes brittle due to low temperature and fails to follow flexing of the corrugated tube 11.

The flexible tube 1*a* further includes the optical fiber 17. The optical fiber 17 is provided between the heat insulating layers 13*a* and 13*b*, and is spirally and continuously wound around the waterproof layer 9. Desirably, the optical fiber 17 is wound on the outer periphery of the waterproof layer 13*a* at a constant pitch. The winding pitch of the optical fiber 17 is preferably about 200 mm, more preferably, about 100 mm. Notably, the optical fiber 17 is inserted into a metallic tube 19 to be described later, and wound around the flexible tube 1*a*.

Figure 4:
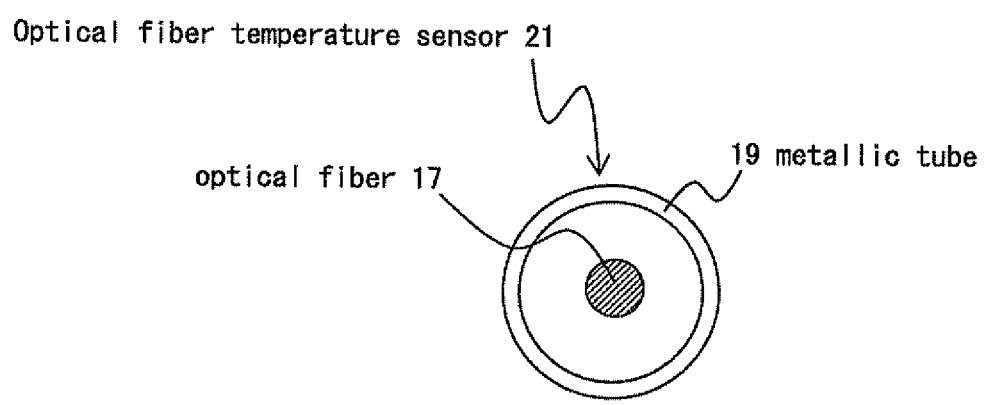
FIG. 4 is a sectional view showing an optical fiber temperature sensor 21.

FIG. 4 is a sectional view showing the structure of an optical fiber temperature sensor 21. The optical fiber temperature sensor 21 is composed of the metallic tube 19, the optical fiber 17, etc. The optical fiber 17 is inserted into the metallic tube 19. For example, a stainless steel pipe having a diameter of about 1 to 2 mm can be used as the metallic tube 19. Notably, desirably, the optical fiber 17 has an extra length ratio (the ratio of an extra length of the optical fiber 17 in relation to the length of the metallic tube 19) of 1% or more so that, when the flexible tube 1*a* deforms, the optical fiber 17 can follow the deformation of the flexible tube 1*a*.

The optical fiber temperature sensor 21 measures a temperature distribution by making use of the phenomenon that the intensity of Raman scattering light depends on temperature and the concept that the location where Raman scattering light is generated can be determined from a time required for an optical pulse to propagate back and forth through the optical fiber 17. When optical pulses are fed to the optical fiber 17 at a constant period, Raman scattering light is generated as backward scattering light. The ratio in intensity between anti-Stokes light and Stokes light of Raman scattering light depends on the temperature of the optical fiber 17.

That is, the intensity of scattering light (the intensity ratio between anti-Stokes light Ia and Stokes light Is) increases and decreases with temperature. Accordingly, the temperature at each measurement position can be known by means of observing the intensity ratio between anti-Stokes light and Stokes light for the fed optical pulse on the time axis. That is, the optical fiber temperature sensor 21 can measure the temperature distribution of the flexible tube 1*a*.

Figure 5:
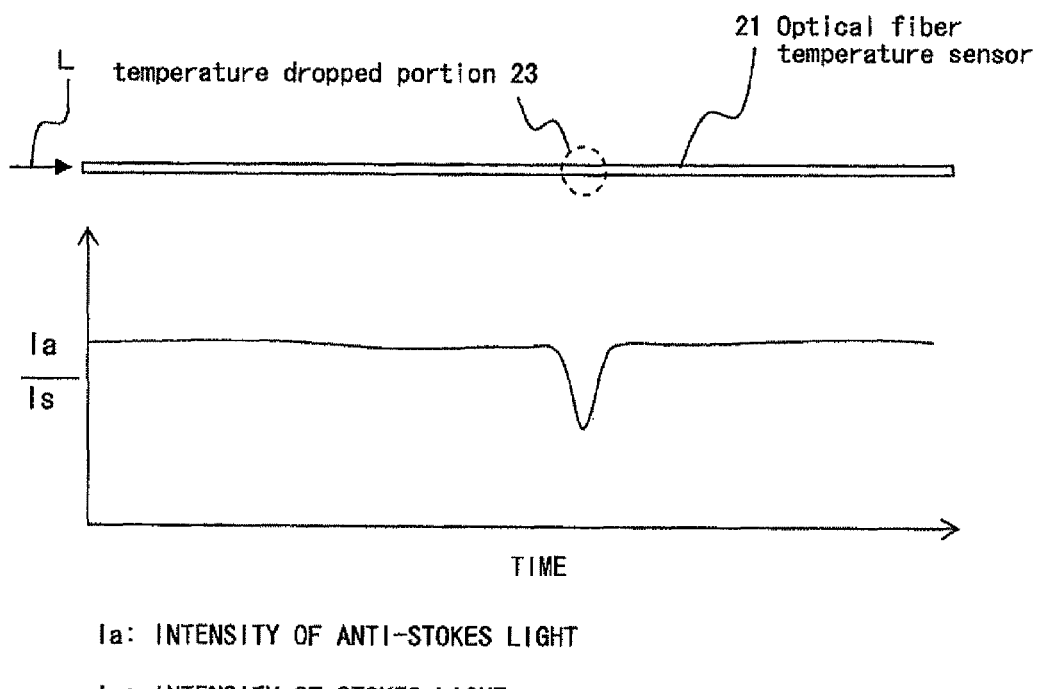
FIG. 5 is a schematic view showing a state in which a temperature dropped portion 23 is detected by the optical fiber temperature sensor 21.

FIG. 5 is a schematic diagram showing a change in a measurement value (the intensity ratio between anti-Stokes light Ia and Stokes light Is) of Raman scattering light in the case where the optical fiber temperature sensor 21 has a temperature dropped portion 23. Since the optical fiber temperature sensor 21 is located on the outer side of the heat insulating layer 13*a*, in an ordinary state, the influence, on the optical fiber temperature sensor 21, of the temperature of LNG flowing through the corrugated tube 11 is small. Therefore, the optical fiber temperature sensor 21 shows that the temperature is constant (substantially ordinary temperature) over the entire length of the flexible tube 1*a* (the entire length of the optical fiber temperature sensor 21). In such a case, the intensity ratio between anti-Stokes light Ia and Stokes Is light measured for the optical pulse L becomes approximately constant over the entire length of the optical fiber temperature sensor 21.

Meanwhile, when the corrugated tube 11 breaks and LNG or the like flows out from a portion of the corrugated tube 11, the LNG permeates the heat insulating layer 13a, and the temperature of the optical fiber temperature sensor 21 sharply drops at a position corresponding to that portion. That is, the temperature dropped portion 23 is produced in the optical fiber temperature sensor 21.

When the temperature sharply dropped portion 23 is produced in the optical fiber temperature sensor 21, the intensity of Raman scattering light (the intensity ratio between anti-Stokes light Ia and Stokes light Is) decreases at the temperature dropped portion 23. Accordingly, the optical fiber temperature sensor 21 can detect an approximate position of the temperature dropped portion 23 and a temperature drop at that position. Accordingly, in the case where LNG is locally leaked from the corrugated tube 11 within the flexible tube 1a, a portion of the optical fiber temperature sensor 21 located near the position of the leakage can immediately detect a sharp temperature drop, to thereby detect the leakage of LNG within the flexible tube 1a.

Figure 6:
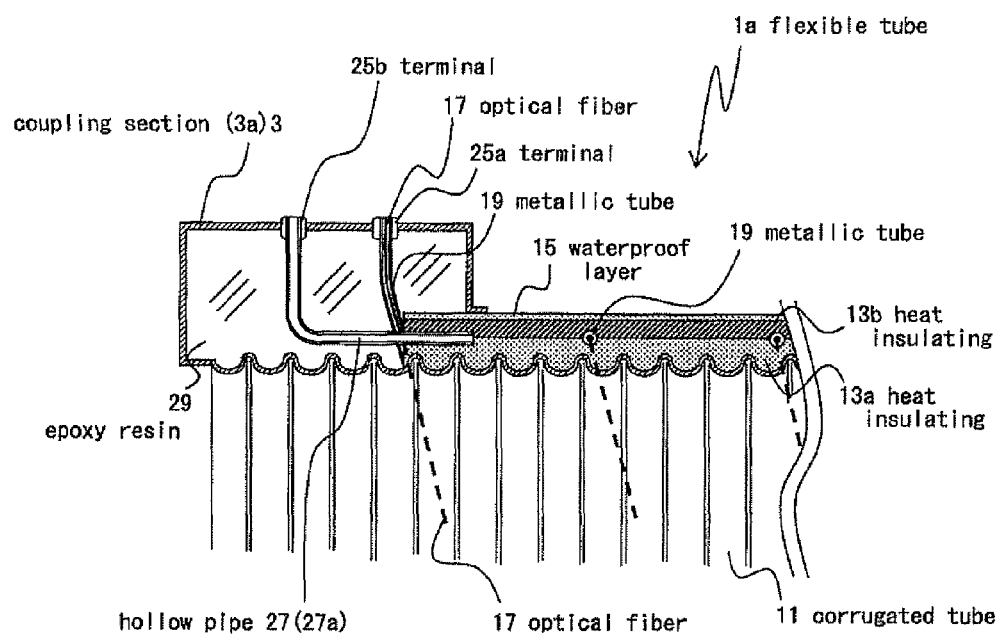
FIG. 6 is a sectional view of a coupling section 3a of the flexible tube 1a and the vicinity thereof.

Next, the coupling section 3 of the flexible tube 1a will be described. FIG. 6 is a sectional view of the coupling section 3. The coupling section 3 is a portion for coupling the flexible tube 1a to a coupling section (connecting portion) provided at another location; for example, the tank 5, the tanker 7, or the like.

The coupling section 3 is provided at an end portion of the flexible tube 1a, and projects radially outward over the entire circumference of the end portion of the flexible tube 1a, to thereby assume a flange-like shape. One end portion of the coupling section 3 is joined to an end portion of the corrugated tube 11. The other end portion of the coupling section 3 is joined to the outer circumferential surface of the waterproof layer 15. A hollow pipe 27 and the metallic tube 19 including the optical fiber 17 inserted therein are provided within the coupling section 3. An end portion of the hollow pipe 27 is inserted between the heat insulating layers 13a and 13b.

Terminals 25a and 25b are provided at the coupling section 3. The terminals 25a and 25b establish communication between the exterior and interior of the coupling section 3. An end portion of the optical fiber 17 wound around the flexible tube 1a is connected to the terminal 25a, and can be connected to a device external to the coupling section 3. The hollow pipe 27 extends from the heat insulating layers 13a and 13b to the terminal 25b. Notably, each of the terminals 25a and 25b may be a mere hole, or may be provided with an optical connector, a tube joint, or the like, being changed corresponding with a member connected to the respective terminal.

For example, joining between the end portion of the corrugated tube 11 and the coupling section 3 is performed by means of welding. Further, joining between the coupling section 3 and the outer circumferential surface of the waterproof layer 15 is fixedly performed by use of a packing and a ring-shaped press member, which are not shown. The interior of the coupling section 3 is filled with epoxy resin 29. That is, the coupling section 3 is hermetically joined between the surface of the waterproof layer 15 and the end portion of the corrugated tube 11, so that liquid or gas does not flow into the heat insulating layers 13a and 13b from the exterior of the flexible tube 1a. Accordingly, the waterproof layer 15 covers the outer circumferential surface of the heat insulating layer 13b, the corrugated tube 11 covers the inner circumferential surface of the heat insulating layer 13a, and the coupling section 3 (the epoxy resin 29) covers the end portions of the heat insulating layers 13a and 13b.

As described above, the optical fiber 17 (the optical fiber temperature sensor 21) is continuously wound over the entire length of the flexible tube 1a. Therefore, if LNG leaks from a portion of the corrugated tube 11, the LNG permeates the heat insulating layer 13a, and the leakage of the LNG can be detected immediately. That is, information representing the leakage (information representing a temperature change) detected by the optical fiber temperature sensor 21 is transmitted, via the terminal 25a, to the temperature measurement device provided outside.

Meanwhile, when similar leakage occurs in the vicinity of the coupling section 3, the optical fiber temperature sensor 21 encounters difficulty in detecting the leakage, for the following reason. Since the heat insulating materials 13a and 13b are not provided at the coupling section 3 and the coupling section 3 is always low in temperature, a temperature change at the time of leakage is small. Moreover, in the case where the temperature measurement device or the like is provided in the vicinity of the coupling section 3, sensitive measurement becomes difficult to perform, because the distance between the incident position of light and the measurement position (in the vicinity of coupling section 3) is too short.

If LNG leaks in the vicinity of the coupling section 3, the LNG permeates the heat insulating layers 13a and 13b, because the LNG has no where to go, other than the heat insulating layers 13a and 13b as described above. At that time, the gas pressure inside the heat insulating layers 13a and 13b increases due to the internal pressure of LNG within the corrugated tube 11 and a pressure generated as a result of vaporization of LNG. When the pressure inside the heat insulating layers 13a and 13b increases, information representing a pressure change is transmitted to the terminal 25b via the hollow pipe 27. By means of externally connecting a hollow pipe, a tube, or the like to the terminal 25b, and then connecting it to a pressure meter or the like, information representing the pressure change within the coupling section 3 can be attained. That is, the leakage information which represents a gas pressure change caused by the leakage of LNG is transmitted to the outside of the coupling section 3 via the hollow pipe 27, whereby the leakage can be detected. Notably, a detection mechanism has been described for the case where LNG has leaked in the vicinity of the coupling section whose interior is filled with epoxy resin. However, the interior of the coupling section is not necessarily required to be filled with epoxy resin. In such a case, the hollow pipe can be omitted, and the leakage information is transmitted directly to the terminal. Alternatively, there may be employed a configuration in which a space is provided in the vicinity of a location where the end portion of the corrugated tube and the coupling section are welded together (within the coupling section), and information representing leakage in that space is transmitted to the terminal via a hollow pipe. In this case, leakage at the welded portion can be detected efficiently.

Figure 7:
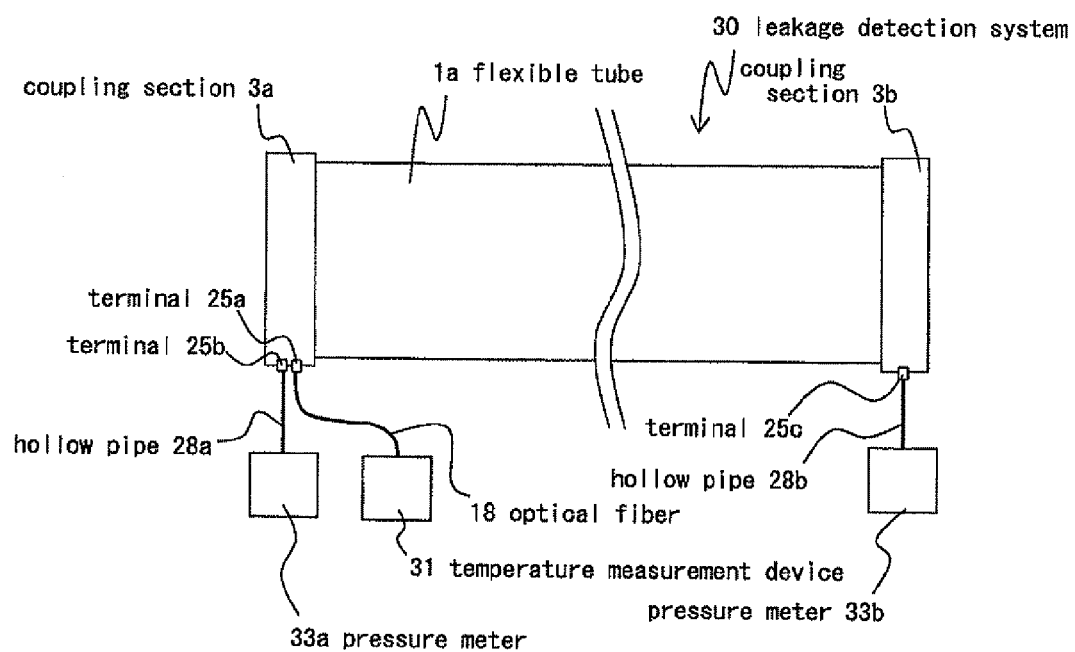
FIG. 7 is a view showing the structure of a leakage detection system 30.

Next, there will be described a leakage detection system 30 in which the flexible tube 1 is used. FIG. 7 is a view showing the configuration of the leakage detection system 30. The leakage detection system 30 is mainly composed of the flexible tube 1a, pressure meters 33a and 33b, and a temperature measurement device 31. A coupling section 3b is provided at one end portion of the flexible tube 1a, and a terminal 25c is provided at the coupling section 3b. Furthermore, a coupling section 3a is provided at the other end portion of the flexible tube 1a, and the terminals 25a and 25b are provided there. The optical fiber temperature sensor 21, continuously wound inside the flexible tube 1a, is connected to the inner end of the terminal 25a.

Connected to the terminals 25b and 25c are the hollow pipes 27 which are provided within the coupling sections 3a and 3b, respectively, and whose end portions are inserted into the heat insulating layers 13a and 13b. For example, the terminal 25a is an optical connector, and establishes optical connection between the optical fiber 17 connected to the inner end thereof and an optical fiber 18 provided externally to the coupling section 3a. The terminals 25b and 25c are gas couplers, through which the hollow pipes 27 connected to the inner ends thereof communicate with hollow pipes 28a and 28b provided externally to the coupling sections 3.

The optical fiber 18 is connected to the temperature measurement device 31. The temperature measurement device 31 can supply optical pulses to the optical fiber 17 via the optical fiber 18. Furthermore, the temperature measurement device 31 can convert to temperature information the information transmitted from the optical fiber 17 via the optical fiber 18 and representing the intensity of reflection light, and can monitor the flexible tube 1a over the entire length thereof so as to determine whether or not a temperature change portion has been produced. That is, the optical fiber 17 functions as the optical fiber temperature sensor 21, and can detect leakage of LNG over the entire length of the flexible tube 1a.

Meanwhile, the hollow pipes 28a and 28b are connected to the pressure meters 33a and 33b. The pressure meters 33a and 33b can monitor the gas pressures transmitted from the hollow pipes 28a and 28b so as to determine whether or not a pressure change has occurred in the flexible tube 1a; in particular, in the vicinity of the coupling sections 3 thereof. That is, the pressure meters 33a and 33b can detect leakage in the vicinity of the coupling sections 3 from a change in the gas pressure of the heat insulating layers 13a and 13b in the vicinity of the coupling sections 3.

As described above, in the leakage detection system 30 according to the present embodiment, the optical fiber temperature sensor 21 is used for detection of leakage of LNG in the flexible tube 1a, and leakage of LNG in the vicinity of the coupling sections 3 can be detected by the hollow pipes 27 and the pressure meters 33a and 33b. Therefore, there can be attained a fluid leakage detecting system capable of detecting leakage of LNG in the vicinity of the coupling sections 3 as well.

In particular, the waterproof layer 15 covers the circumference of the heat insulating layers 13a and 13b, and the hollow pipes 27 provided in the coupling sections 3 can transmit to the terminals 25b and 25c changes in the gas pressures of the heat insulating layers 13a and 13b. Therefore, even in the case of leakage of a small amount of fluid through a pinhole or the like, the leakage can be detected without fail. Furthermore, since the terminals 25a, 25b, and 25c can be connected to devices provided externally to the coupling sections 3, leakage information can be transmitted from the interior of the flexible tube 1a to the exterior thereof, and leakage of LNG in the vicinity of the coupling sections 3 can be readily detected.

Notably, in place of the pressure meters 33a and 33b, gas concentration meters can be attached. In this case, LNG filling the interiors of the heat insulating layers 13a and 13b is fed to the gas concentration meters via the hollow pipes 27, 28a, etc, and leakage of LNG in the vicinity of the coupling sections 3 can be detected from a change in gas concentration.

Next, there will be described a flexible tube 1b according to a second embodiment and a leakage detection system 40 using the same. In the following embodiment, components which have the same functions as those of the flexible tube 1a and the leakage detection system 30 shown in FIGS. 1 to 7 are denoted by reference numerals identical with those used in FIGS. 1 to 7, and their repeated descriptions are omitted. The flexible tube 1b according to the second embodiment has a structure substantially identical with that of the flexible tube 1a, except for the following point. That is, the flexible tube 1b differs from the flexible tube 1a in that optical pressure sensors are provided, and one end of the optical fiber 17 is connected to one of the optical pressure sensor.

Figure 8:
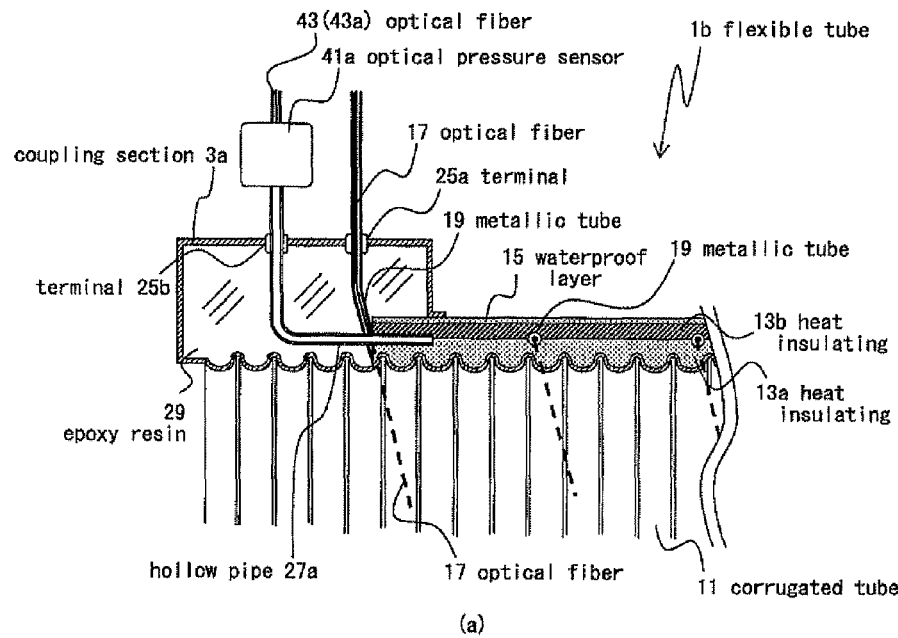
FIG. 8(a) is a sectional view of a coupling section 3a of a flexible tube 1b and the vicinity thereof.
FIG. 8(b) is a sectional view of a coupling section 3b of the flexible tube 1b and the vicinity thereof.
Figure 8:
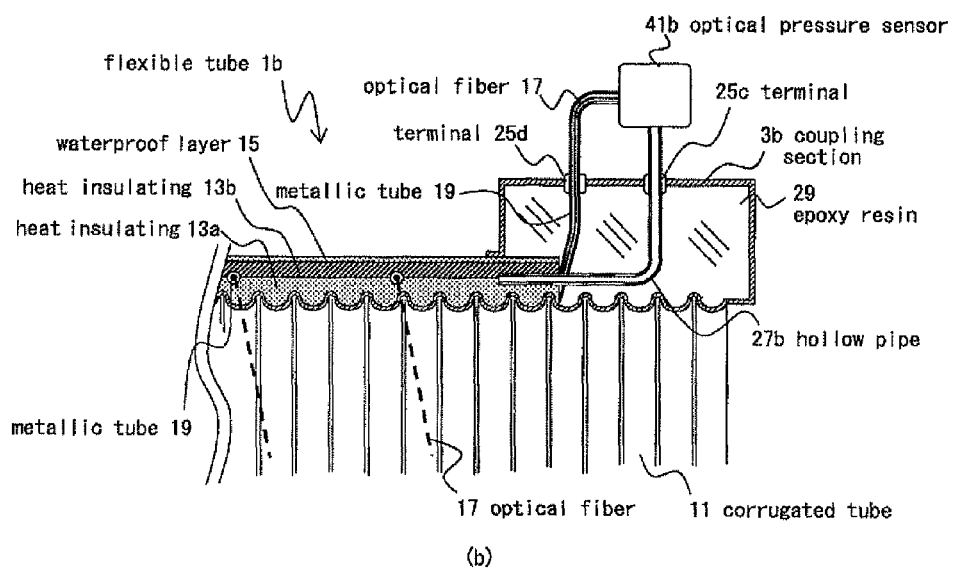

FIGS. 8(a) and 8(b) are sectional views of the flexible tube 1b, wherein FIG. 8(a) shows the coupling section 3a and its vicinity, and FIG. 8(b) shows the coupling section 3b and its vicinity. In the flexible tube 1b, the hollow pipe 27a is extended to the outside of the coupling section 3a via the terminal 25b, and an optical pressure sensor 41a is connected to the distal end thereof. An optical fiber 43a is connected to the optical pressure sensor 41a. Similarly, the optical fiber 17 is extended to the outside via the terminal 25a.

Similarly, the hollow pipe 27b is provided in the coupling section 3b, and is extended to the outside of the coupling section 3b via the terminal 25c, and an optical pressure sensor 41b is connected to the distal end thereof. The optical fiber 17 is led to the outside of the coupling section 3b via the terminal 25d, and the distal end of the optical fiber 17 is connected to the optical pressure sensor 41b.

Figure 9:
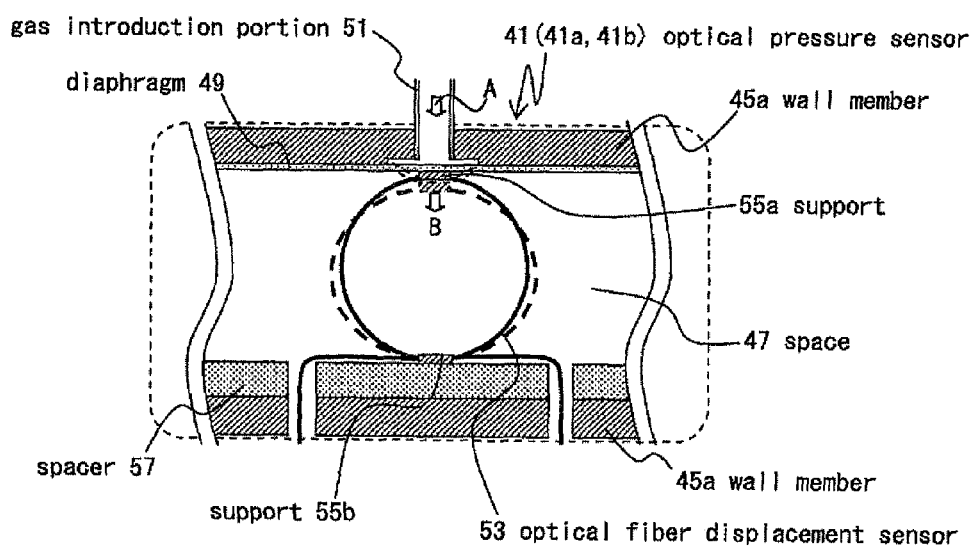
FIG. 9 is a view showing the structure of an optical pressure sensor 41.

FIG. 9 is a view showing the optical pressure sensor 41. The optical pressure sensor 41 is mainly composed of wall members 45a and 45b, supports 55a and 55b, a diaphragm 49, and an optical fiber displacement sensor 53.

The paired wall members 45a and 45b are fixed together with a space 47 formed therebetween. A gas introduction portion 51 is provided on a portion of the wall member 45a. Gas is introduced into the optical pressure sensor 41 via the gas introduction portion 51. The diaphragm 49 is provided on the inner surface of the wall member 45a. The diaphragm 49 can move vertically within the space 47 in accordance with the pressure of the gas from the gas introduction portion 51. A spacer 57 is provided on the inner surface of the wall member 45b.

The optical fiber displacement sensor 53 is provided in the space 47. A top portion of the optical fiber displacement sensor 53 is joined to the diaphragm via the support 55a. Meanwhile, a lower portion of the optical fiber displacement sensor 53 is joined to the spacer 57 via the support 55b.

The optical fiber displacement sensor 53 is a single-mode optical fiber formed in a loop shape, and deforms into an elliptical shape in accordance with a relative displacement between the supports 55a and 55b. Deformation of the optical fiber displacement sensor 53 into an elliptical shape causes changes in the radiuses of curvature as measured at positions 90° shifted from the positions of the supports 55a and 55b. The transmission loss of the light supplied to the optical fiber displacement sensor 53 changes in accordance with the changes in the radiuses of curvature of the optical fiber displacement sensor 53. Through measurement of the transmission loss, the amount of displacement of the optical fiber displacement sensor 53 can be determined.

When gas is introduced via the gas introduction portion 51 as indicated by arrow A in FIG. 9, the pressure of the gas acts on the optical fiber displacement sensor 53 via the diaphragm 49 and the support 55a, whereby the optical fiber displacement sensor 53 deforms in the direction of arrow B, and assumes an elliptical shape (a broken line in FIG. 9). The transmission loss in this state is measured, and the displacement amount of the optical fiber displacement sensor 53 is converted to the gas pressure, whereby the gas pressure can be known.

Notably, for example, a pressure sensor disclosed in Japanese Patent Application Laid-Open (kokai) No. H10-82621 can be used as such an optical pressure sensor. Alternatively, there can be used a sensor in which incident light from an optical fiber is converged by a small quartz rod lens and is reflected by a reflection mirror, the intensity of reflection light is measured so as to measure a displacement of the small quartz rod lens in relation to the reflection mirror, and the displacement is converted to pressure.

Alternatively, there can be used an optical fiber grating sensor (FBG sensor) in which a single-mode optical fiber for communications whose refractive index is periodically changed by use of Bragg gratings is irradiated with light, and a phenomenon that distortion at the Bragg gratings is proportional to the wavelength of reflection light is used so as to measure a displacement caused by a force through measurement of the wavelength of the reflection light. That is, there can be used any pressure sensor using optical method.

Figure 10:
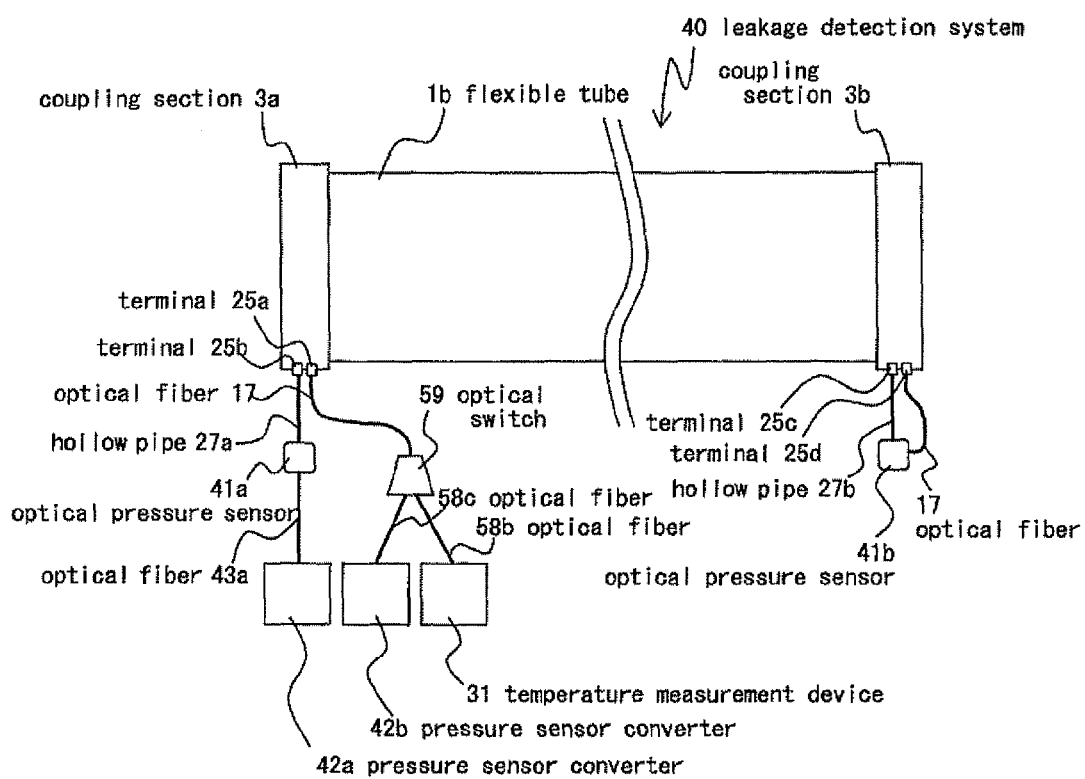
FIG. 10 is a view showing the structure of a leakage detection system 40.

FIG. 10 is a view showing a leakage detection system 40 in which the flexible tube 1b is used. The leakage detection system 40 is mainly composed of the flexible tube 1b, pressure sensor converters 42a and 42b, the optical pressure sensors 41a, 41b, an optical switch 59, and the temperature measurement device 31.

The optical pressure sensor 41a is connected via the terminal 25b to the coupling section 3a provided at one end portion of the flexible tube 1b. The optical pressure sensor 41a is connected to the pressure sensor converter 42a via the optical fiber 43a. The pressure sensor converter 42a can supply incident light to the optical pressure sensor 41a via the optical fiber 43a. Furthermore, the pressure sensor converter 42a can receive via the optical fiber 43a, information representing a displacement measured by the optical pressure sensor 41a, and can convert it to the gas pressure in the vicinity of the coupling section 3a.

That is, the pressure of the heat insulating layers 13a and 13b in the flexible tube 1b is transmitted to the optical pressure sensor 41a via the hollow pipe 27a. The amount of displacement of the optical fiber displacement sensor 53 measured by the optical pressure sensor 41a is converted to pressure information by the pressure sensor converter 42a, whereby the gas pressure of the heat insulating layers 13a and 13b in the vicinity of the coupling section 3a can be measured.

One end portion of the optical fiber 17 is connected to the optical switch 59. The optical fiber 17 is introduced into the flexible tube 1b through the terminal 25a, and is continuously wound within the flexible tube 1b. The other end portion of the optical fiber 17 is led to the outside via the terminal 25d provided at the coupling section 3b, and is connected to the optical pressure sensor 41b. The optical pressure sensor 41b is connected to the coupling section 3b via the hollow pipe 27b.

Through switching, the optical switch 59 can transmit the information from the optical fiber 17 to either the pressure sensor converter 42b or the temperature measurement device 31 via the optical fibers 58b and 58c, respectively. Accordingly, when the optical switch 59 is switched to transmit the information from the optical fiber 17 to the pressure sensor converter 42b, the information from the optical pressure sensor 41b can be attained.

The pressure of the hear insulating layers 13a and 13b in the flexible tube 1b in the vicinity of the coupling section 3b is transmitted to the optical pressure sensor 41b via the hollow pipe 27b, and the amount of displacement of the optical fiber displacement sensor 53 measured by the optical pressure sensor 41b is converted to pressure information by the pressure sensor converter 42b via the optical fiber 17. Therefore, the gas pressure of the heat insulating layers 13a and 13b in the vicinity of the coupling section 3b can be measured.

Meanwhile, when the optical switch 59 is switched to transmit the information from the optical fiber 17 to the temperature measurement device 31, the information from the optical fiber 17 can be used as information from the optical fiber temperature sensor 21, whereby information representing leakage of LNG over the entire length of the flexible tube 1b can be attained.

According to the leakage detection system 40 of the second embodiment, effects similar to those of the first embodiment can be attained. Moreover, since the optical pressure sensors 41a and 41b are used as pressure meters, pressure information can be transmitted through an optical fiber. Furthermore, one end portion of the optical fiber 17 is connected to the optical pressure sensor 41b, the other end portion thereof is connected to the pressure switch 59, and the pressure switch 59 selectively establishes connection with the temperature measurement device 31 or the pressure sensor converter 42b. Therefore, the optical fiber 17 has two functions; i.e., a function of serving as a medium for transmitting information from the optical pressure sensor 41b, and a function of serving as the optical fiber temperature sensor 21. Therefore, from the coupling section 3a side, there can be obtained the information of leakage in the vicinity of the coupling section 3b, which is an end portion of the flexible tube 1b opposite the coupling section 3a.

Next, there will be described a flexible tube 1c according to a third embodiment and a leakage detection system 60 using the same. The flexible tube 1c according to the third embodiment has a structure substantially identical with that of the flexible tube 1b, except for the following point. That is, the flexible tube 1c differs from the flexible tube 1b in that a plurality of optical fibers 17 are provided.

Figure 11:
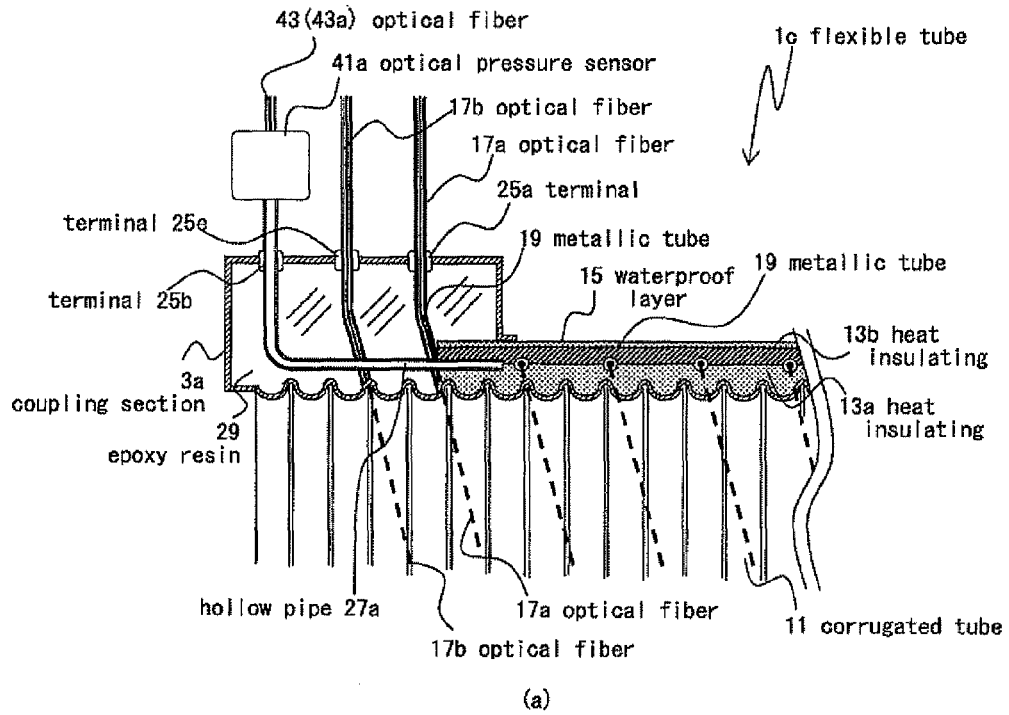
FIG. 11(a) is a sectional view of a coupling section 3a of a flexible tube 1c and the vicinity thereof.
Figure 11:
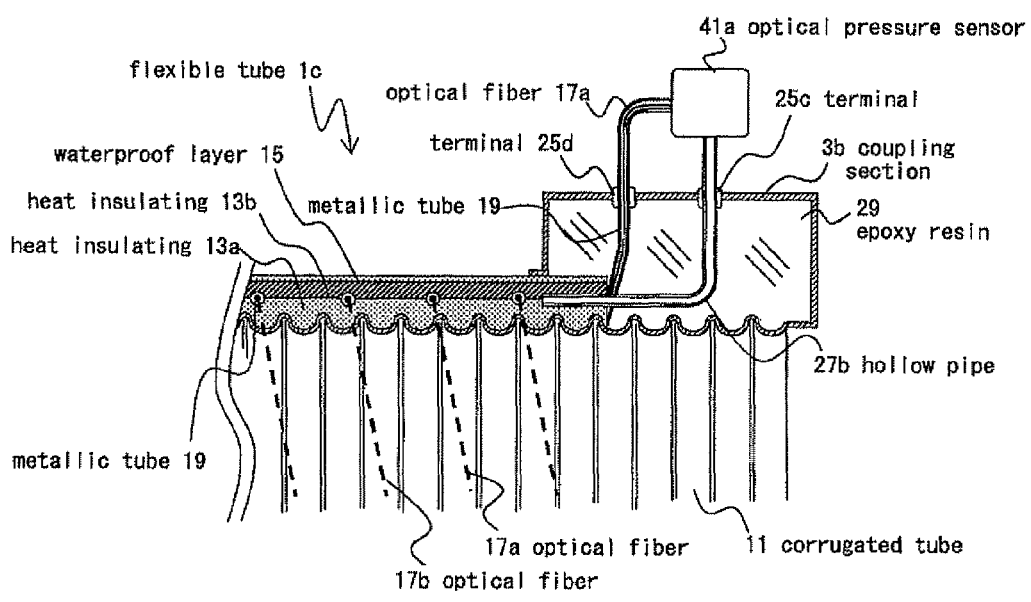

FIGS. 11(a) and 11(b) are sectional views of the flexible tube 1c, wherein FIG. 11(a) shows the coupling section 3a and its vicinity, and FIG. 11(b) shows the coupling section 3b and its vicinity. In the flexible tube 1c, the hollow pipe 27a is extended to the outside of the coupling section 3a via the terminal 25b, and the optical pressure sensor 41a is connected to the distal end thereof. The optical fiber 43a is further connected to the optical pressure sensor 41a.

A plurality of optical fibers 17a and 17b, each inserted into the metallic tube 19, are wound around the flexible tube 1c. The optical fibers 17a and 17b are extended to the outside via the terminal 25a and another terminal 25e provided at the coupling section 3a.

Similarly, the hollow pipe 27b is provided in the coupling section 3b, and is extended to the outside of the coupling section 3b via the terminal 25c, and the optical pressure sensor 41b is connected to the distal end thereof. The distal end of the optical fiber 17a is connected to the optical pressure sensor 41b.

Figure 12:
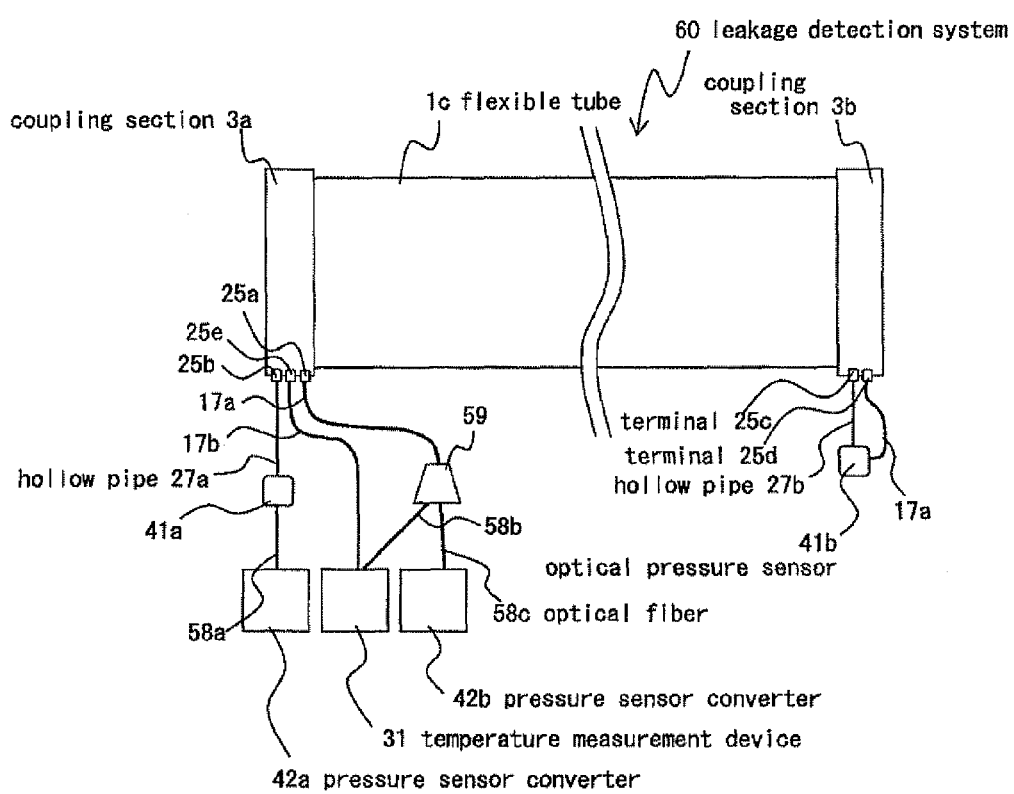
FIG. 12 is a view showing the structure of a leakage detection system 60.

FIG. 12 is a view showing a leakage detection system 60 in which the flexible tube is used. The leakage detection system 60 is mainly composed of the flexible tube 1c, the pressure sensor converters 42a and 42b, the optical pressure sensors 41a and 41b, the optical switch 59, and the temperature measurement device 31.

The optical pressure sensor 41a is connected via the terminal 25b to the coupling section 3a provided at one end portion of the flexible tube 1c. The optical pressure sensor 41a is connected to the pressure sensor converter 42a via the optical fiber 58a. Therefore, the pressure of the heat insulating layers 13a and 13b in the vicinity of the coupling portion 3a of the flexible tube 1c is transmitted to the optical pressure sensor 41a via the hollow pipe 27a. The amount of displacement of the optical fiber displacement sensor 53 measured by the optical pressure sensor 41a is converted to pressure information by the pressure sensor converter 42a, whereby the gas pressure of the heat insulating layers 13a and 13b in the vicinity of the coupling section 3a can be measured.

One end portion of the optical fiber 17a is connected to the optical switch 59. The optical fiber 17a is introduced into the flexible tube 1c through the terminal 25a, and is continuously wound within the flexible tube 1c. The other end portion of the optical fiber 17a is led to the outside via the terminal 25d provided at the coupling section 3b, and is connected to the optical pressure sensor 41b. The optical pressure sensor 41b is connected to the coupling section 3b via the hollow pipe 27b.

One end portion of the optical fiber 17b is connected to the temperature measurement device 31. The optical fiber 17b is introduced into the flexible tube 1c through the terminal 25e of the coupling section 3a, and is continuously wound within the flexible tube 1c over the entire length thereof. The optical fiber 17b can function as the optical fiber temperature sensor 21, and can measure a temperature distribution over the entire length of the flexible tube 1c.

Through switching, the optical switch 59 can transmit the information from the optical fiber 17a to either the pressure sensor converter 42b or the temperature measurement device 31. Accordingly, when the optical switch 59 is switched to transmit the information from the optical fiber 17a to the pressure sensor converter 42b, the information from the optical pressure sensor 41b can be attained. That is, the pressure of the hear insulating layers 13a and 13b in the flexible tube 1c in the vicinity of the coupling section 3b is transmitted to the optical pressure sensor 41b via the hollow pipe 27b, and the amount of displacement of the optical fiber displacement sensor 53 measured by the optical pressure sensor 41b is converted to pressure information by the pressure sensor converter 42b via the optical fiber 17a. Therefore, the gas pressure of the heat insulating layers 13a and 13b in the vicinity of the coupling section 3b can be measured.

Meanwhile, when the optical switch 59 is switched to transmit the information from the optical fiber 17a to the temperature measurement device 31, the optical fiber 17a can be used as the optical fiber temperature sensor 21, whereby information representing leakage of LNG over the entire length of the flexible tube 1c can be obtained.

According to the leakage detection system 60 of the third embodiment, effects similar to those of the first embodiment can be attained. Moreover, the plurality of optical fibers 17a and 17b are provided in the flexible tube 1c; one optical fiber 17b always detects leakage of LNG in the flexible tube 1c; and the other optical fiber 17a can be selectively connected to the temperature measurement device 31 and the pressure sensor converter 42b through switching effected by the optical switch 59. Therefore, even in the case where one of the optical fibers 17a and 17b is broken, leakage detection can be performed over the entire length of the flexible tube 1c.

While the embodiments of the present invention have been described with reference to the appended drawings, the technical scope of the present invention is not limited to the embodiments. It is apparent that those skilled in the art can easily conceive various variations or modifications without departing from technical ideas described in claims, and these variations or modifications are to be construed as falling within the technical scope of the present invention.

For example, in the leakage detection system 60, two optical fibers 17a and 17b are provided; however, the number of optical fibers is not limited thereto. Through provision of a larger number of optical fibers 17 and through utilization of the optical switch 59, a state in which leakage detection becomes impossible because of breakage of an optical fiber can be avoided, and a more reliable leakage detection system can be obtained.

Application of the flexible tubes 1a, etc. of the embodiments is not limited to transport of LNG. The flexible tubes 1a, etc. can be used for transport of fluid of other types. Especially, for fluids other than those of ordinary temperature, the optical fiber temperature sensor 21 can be used. Further, the hollow pipes 27, the pressure meters, etc., can realize a function of detecting leakage in the vicinity of the coupling section.

In the above-described embodiments, an example case where flexible tubes are used on the sea is shown. However, the present invention is not limited thereto. For example, the present leakage detection system can be applied not only to the flexible tubes but also to fixed piping for transporting fluid, such as LNG, on the ground. In such a case, the detection of leakage can be performed over the entire length of the fluid transport piping, and leakage in the vicinity of the coupling section can also be detected, whereby similar effects can be attained.

The invention claimed is:
1. A fluid leakage detecting system comprising:
a fluid conveying tube comprising:
   a tube member that is a corrugated metallic tube having flexibility;
   a heat insulating layer provided on the outer periphery of the tube member:
   an optical fiber continuously wound around the heat insulating layer;
   a coupling section provided at an end portion of the tube member; and
   leakage information transmission means provided in the vicinity of the coupling section and being capable of transmitting, to the outside of the coupling section, leakage information of fluid which flows through the tube member, wherein:
      the leakage information is gas pressure or gas concentration;
      the leakage information transmission means transmits the gas pressure or gas concentration in the vicinity of the coupling section to the outside of the coupling section via a terminal provided in the vicinity of the coupling section; and
      the leakage information transmission means detects the gas pressure or gas concentration in the vicinity of the coupling section via a hollow pipe communicating with the heat insulating layer;
   a plurality of optical fibers are provided in the fluid conveying tube: and
an optical pressure sensor connected to the leakage information transmission means; and
an optical pressure sensor converter for converting information output from the optical pressure sensor to pressure information, wherein:
   the optical fiber is connected to a temperature measurement device and functions as an optical fiber temperature sensor, wherein leakage of the fluid from the tube member is detected from a temperature distribution measured by the optical fiber temperature sensor;
   leakage of the fluid from the tube member in the vicinity of the coupling section is detected from leakage information transmitted from the leakage information transmission means;
   a portion of the plurality of optical fibers is connected to the temperature measurement device and functions as the optical fiber temperature sensor; and the remaining optical fiber(s) is connected to the optical pressure sensor converter and functions as a medium for transmitting information from the optical pressure sensor.

2. A fluid leakage detecting system according to claim 1, further comprising:

an optical switch connected to the optical fiber, wherein the optical fiber can be connected to either the temperature measurement device or the optical pressure sensor converter by means of switching effected by the optical switch, and wherein, when the optical fiber is connected to the temperature measurement device, the optical fiber functions as the optical fiber temperature sensor, and, when the optical fiber is connected to the optical pressure sensor converter, the optical fiber functions as a medium for transmitting information from the optical pressure sensor.

* * * * *